Aug. 13, 1968 S. H. CLARK 3,396,484
FISHING SINKER
Filed Dec. 5, 1966
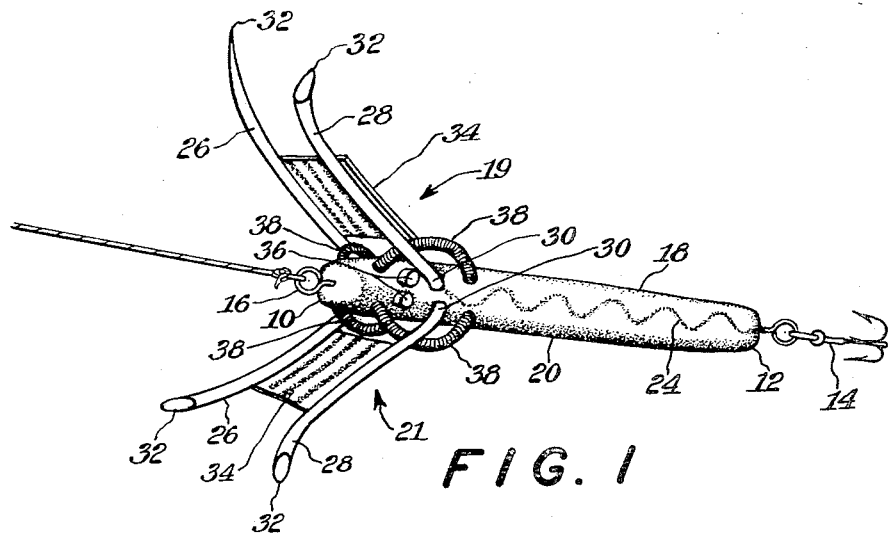
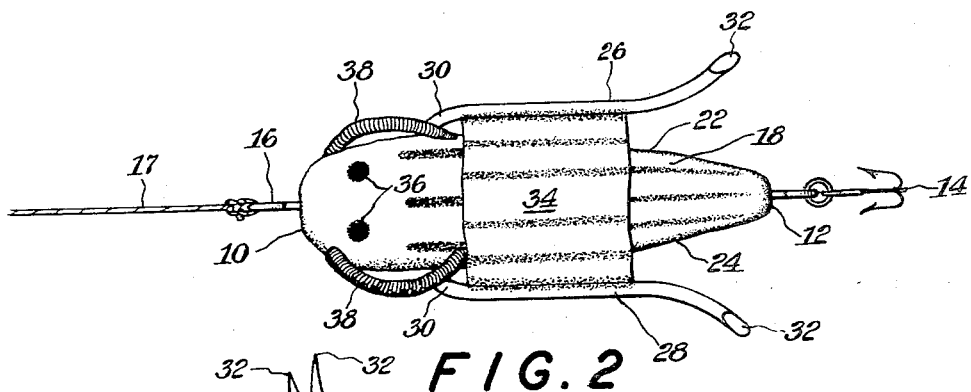
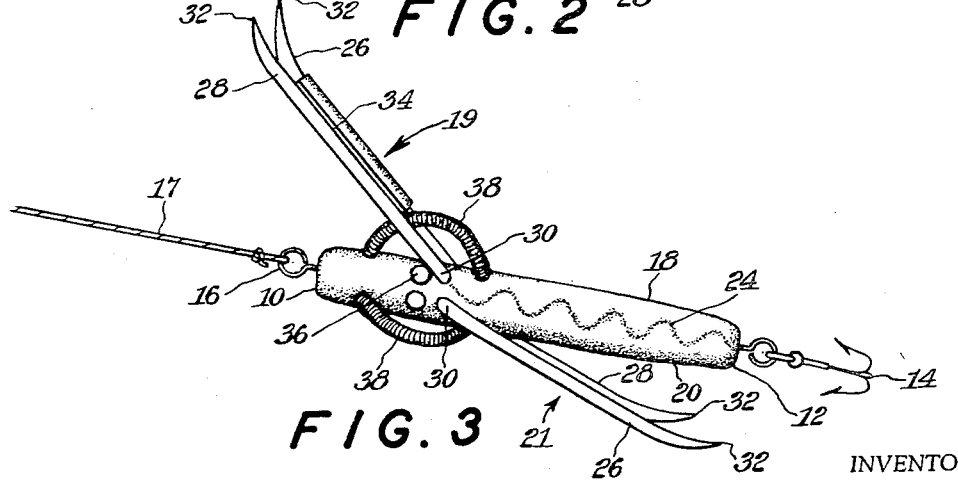
INVENTOR.
SAMUEL HESS CLARK 3,396,484
FISHING SINKER
Samuel Hess Clark, 8873 Kibbie Road,
Marysville, Calif. 95901
Filed Dec. 5, 1966, Ser. No. 599,081
5 Claims. (Cl. 43—42.13)

My invention is directed toward sinkers as used on fishing lines.

It is an object of my invention to provide a new and improved fishing sinker having a pair of movable elements which enhance trolling action in water or can hold the sinker firmly to the bottom of the body of water when so desired.

Another object is to provide a new and improved fishing sinker so constructed that no matter how it lands on the bottom of the body of water into which it is thrown, pointed prongs secured to the main body of the skinner will catch bottom and hold the sinker in place against accidental dislodgement.

Still another object is to provide a new and improved fishing sinker of the character indicated which can be manufactured easily and inexpensively.

All of the foregoing and still further objects and advantages of my invention will now be explained with reference both to this specification and to the accompanying drawings wherein:

FIG. 1 is a perspective view of my sinker in position to be cast into the water;

FIG. 2 is a top view of my sinker in trolling position; and

FIG. 3 is a side view of my sinker in position just after release from the bottom of the body of water into which it had originally been cast.

Referring now to FIGS. 1–3, there is shown an elongated sinker body having a broad head end 10 and a narrow tail end 12. At least one fishhook 14 is secured to end 12 and an eye 16 is secured to end 10. A fishing line 17 can be secured at one end to eye 16.

The body has first and second generally parallel spaced apart main surfaces 18 and 20 interconnected by first and second side surfaces 22 and 24 which are oppositely disposed and extend transversely between the two main surfaces.

I further provide first and second prong members 19 and 21. Each prong member includes first and second prongs 26 and 28 having front inwardly turning ends 30 and rear outwardly extending pointed ends 32, the midsections of these prongs being joined or interconnected by flat gliding shields 34. The front ends 30 of each prong member are pivotally secured in the corresponding surfaces 22 and 24 adjacent head end 10. The first member 19 is associated with surface 18; the second member is associated with surface 20.

Each member has a forward position at which the ends 32 extend forward of head end 10 and extend outward therefrom as shown in FIG. 1 and a rear position at which the shield and prongs extend along the associated surface with the ends 32 pointing toward tail end 12 and inward toward the sinker body.

First and second spaced apart stop studs 36 extend perpendicularly out of each main surface adjacent the head end. These studs serve to limit the forward extension of ends 32 of any member to that shown by preventing any additional forward motion.

I further provide first, second, third and fourth coil springs 38, two separate springs being associated with each prong member and secured to the associated main surface. The purpose of these springs is to bias the corresponding prong member, when in its forward position, as to prevent accidental dislodgement.

More particularly, when the sinker is prepared for use and cast into the water with both prong members in the forward position as shown in FIG. 1, one or more prongs will catch in the bottom and lock the sinker in place. The springs will hold the prongs in position until the fisherman provides a stiff quick yank via the line whereby the spring bias is overcome and the appropriate prong member is released from the forward position and is thrown into the rear position as shown in FIG. 3.

Finally, when the sinker is to be used for trolling, both prong members are placed in the rear position as shown in FIG. 2, and the gliding shields provide additional lift during trolling.

While I have described my invention with particular reference to the drawings, my protection is to be limited only by the terms of the claims which follow.

Having thus described my invention, I claim as new and desire to secure by Letters Patent:

1. A fishing sinker comprising:
   (a) an elongated body having a broad head end and a narrow tail end, said body having first and second substantially parallel spaced apart main surfaces interconnected by transversely extending substantially parallel oppositely disposed first and second side surfaces;
   (b) a first prong member having first and second interconnected prongs having front and rear ends, the front ends being pivotally secured to corresponding side surfaces adjacent said head, said first member being disposed adjacent said first main surface and having alternative forward and rear positions with respect thereto, the rear ends of the first member prongs extending in front of said body head end when the first member is in its forward position and extending toward the body tail end when the first member is in its rear position; and
   (c) a second prong member having first and second interconnected prongs having front and rear ends, the front ends being pivotally secured to corresponding side surfaces adjacent said head, said second member being disposed adjacent said second main surface and having alternative forward and rear positions with respect thereto, the rear ends of the second member prongs extending in front of said body head end when the second member is in its forward position and extending toward the body tail end when the second member is in its rear position.

2. A sinker as set forth in claim 1 wherein each set of rear prong ends has curved tips, the tips of any rear prong ends extending outward and away from the body head end when the corresponding member is in the forward position and extending inward and toward the body tail end when the corresponding member is in the rear position.

3. A sinker as set forth in claim 2 further including first and second stops secured to said body, each stop limiting the forward extension of the rear prong ends of the corresponding member when the corresponding member is in its forward position.

4. A sinker as set forth in claim 3 further including first, second, third and fourth coil springs, said first and second springs being connected to the first main surface and associated with the first member for biasing same against release when the first member is in the forward position, said third and fourth springs being connected to the second main surface and associated with the second member for biasing same against release when the second member is in the forward position.

5. A sinker as set forth in claim 4 further including a line receiving eye secured to the body head end and at least one fishhook secured to the body tail end.

(References on following page)

References Cited

UNITED STATES PATENTS

| | | | |
|---|---|---|---|
| 1,810,565 | 6/1931 | Kenely | 43—44.96 |
| 1,857,312 | 5/1932 | Kuehn | 43—42.02 |
| 2,545,129 | 3/1951 | Zeigler | 43—42.22 |
| 2,561,750 | 7/1951 | Overton | 43—42.22 |
| 2,980,050 | 4/1961 | Murray | 43—44.96 X |
| 3,006,103 | 10/1961 | Scott | 43—44.97 X |

SAMUEL KOREN, *Primary Examiner.*

J. H. CZERWONKY, *Assistant Examiner.*